United States Patent [19]

Powell et al.

[11] 4,178,339
[45] Dec. 11, 1979

[54] LAMINATED ELECTRODE

[75] Inventors: Peter J. Powell; Gerard D. Nagy, both of Ottawa, Canada

[73] Assignee: Her Majesty the Queen in right of Canada, as represented by the Minister of National Defence

[21] Appl. No.: 845,393

[22] Filed: Oct. 25, 1977

[30] Foreign Application Priority Data

Nov. 17, 1976 [CA] Canada ................................ 265944

[51] Int. Cl.² ............................................. C04B 35/64
[52] U.S. Cl. ..................................... 264/61; 29/623.5; 264/104; 264/272
[58] Field of Search ............. 204/290 R; 264/61, 104, 264/272, DIG. 36; 29/623.5; 427/115, 125; 429/219; 75/201

[56] References Cited

U.S. PATENT DOCUMENTS 3,332,801   7/1967   Holechek et al. .................... 264/104

Primary Examiner—Robert F. White
Assistant Examiner—John A. Parrish
Attorney, Agent, or Firm—Cushman, Darby & Cushman

[57] ABSTRACT

The invention disclosed is a multi-layer silver/silver chloride electrode structure for use in electrolytic cells, particularly at low temperatures. Each layer includes an evenly dispersed matrix of metallic silver bonded to silver chloride particles, compressed onto a metal grid. A method for the manufacture of the electrode is also disclosed.

20 Claims, 4 Drawing Figures

LAMINATED ELECTRODE

This invention relates to silver/silver chloride electrodes for use in electrolytic cells, particularly at low temperatures, and to a method for the manufacture thereof.

Silver chloride electrodes available commercially are generally formed by treating cold rolled silver chloride sheet with a photographic film developing solution to form a uniform deposit of metallic silver on the surfaces on the sheet. While these electrodes are useful for cells working at 0° C. or higher e.g. 45° C., their performance at low temperatures, of the order of −40° C., is not satisfactory.

Ives and Janz "Reference Electrodes, Theory and Practices", Academic Press, New York (1961), pages 208-9 describe the manufacture of electrodes involving the decomposition of silver oxide to provide a porous silver substrate which is either partially converted to silver chloride electrochemically or had contained a silver chlorate, bromate, or iodate, which is decomposed to the corresponding halide. In all cases, the starting material comprises a major amount i.e. 90 to 100% of silver oxide to provide sufficient porous structure in the final electrodes.

E. B. Mathur, et al, in "Indian Journel of Technology", 4–117 (1966) describe a method wherein a mixture of silver powder and silver chloride is pressed and sintered to produce a silver chloride electrode. However, it has been found that the electrode so formed exhibits poor mechanical strength.

Silver/silver chloride electrodes have been made previously by the applicants by forming a mixture of finely divided powder comprising a major amount of silver chloride and a minor amount of a silver compound, for example, silver oxides. The finely divided powder is then compressed onto a metal grid. A final sintering step is carried out at a temperature below the melting point of silver chloride i.e. below 455° C., to reduce the silver compound to metallic silver. For optimum conditions the proportions of silver oxide and silver chloride in the mixture were so chosen that upon thermal decomposition of the silver oxide to silver, the final percentage by weight of metallic silver in the electrode material would be about 10%. This electrode gave adequate performance at low temperatures. Specifically, it gave on the average 40% more utilization at −40° C. and about one-half the variation in discharge time when compared to the cold rolled sheet electrodes. However, overvoltages, on the average 250 mv for a Ag/AgCl cell at −40° C. were not significantly lowered and for the first 20% of the discharge, the sintered electrode had up to 70 mv more overvoltage.

It is thus an object of the invention to provide a silver/silver chloride electrode structure, particularly for low temperature use, which is characterized by high percentage use of the active material i.e. high efficiency and which maintains low overvoltage in use.

According to one aspect of the invention, a silver/silver chloride electrode is provided, comprising a plurality of layers of a porous material comprising an evenly dispersed matrix of metallic silver bonded to silver chloride particles, said material further comprising a major amount of silver chloride and a minor amount of metallic silver, individually compressed onto a metal grid.

According to another aspect of the invention, a method is provided for the manufacture of a silver/silver chloride electrode, said electrode comprising a plurality of layers of a porous material comprising an evenly dispersed matrix of metallic silver bonded to silver chloride particles on a metal grid, said method comprising:

a. preparing a homogeneous mixture in the form of finely divided powder of a major amount of silver chloride and a minor amount of a silver compound reducible to metallic silver at a temperature below the melting point of silver chloride, selected from the group consisting of silver oxides, silver carbonate, disilver fluoride, silver sulfide and mixtures thereof, b. individually compressing a plurality of layers of said mixture onto a metal grid, c. subjecting the assembly so formed to a final pressing step at elevated pressure, and d. sintering, at a temperature below the melting point of silver chloride for a time sufficient to reduce the silver compound to metallic silver.

The silver compounds to be used as starting material are selected from those which are reducible to metallic silver at a temperature lower then the melting point of silver chloride. They are also selected from a safety stand point, since some silver compounds such as AgClO$_2$ tend to explode when heated and some produce poisonous gas upon decomposition to metallic silver. Suitable silver compounds may be selected from the group consisting of silver oxides, silver carbonate, disilver flouride, silver sulfide and mixtures thereof. Among the selected group of silver compounds, silver oxides and silver carbonate are preferred. Silver I oxide (Ag$_2$O) is particularly preferred.

In the drawings which serve to illustrate a preferred embodiment of the invention:

Figure 1:
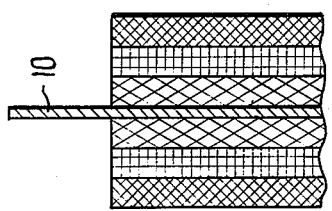
FIG. 1 is a side elevation in section illustrating a homogeneous Ag/AgCl reference electrode.

In a preferred embodiment of the invention, silver chloride and the silver compound are mixed and ground to a particle size of 60 mesh or smaller. The powder thus obtained usually contains a certain amount of moisture depending upon the relative humidity of the surrounding atmosphere. This is preferable since the dry powder tends to form large clusters resulting in a less homogenous mixture. If the obtained powder is too dry, a small amount of water, usually up to 1.0% by weight, should be added. The powdered mixture is then compressed onto both major surfaces of a metal grid, such as a silver or nickel grid, at a pressure of 800 to 1500 psi, preferably at about 1000 psi.

Additional layers of the Ag/AgCl compound mixture, made in the same manner as above, are successively and individually compressed onto both major surfaces of the metal grid also at about 800 to 1500 psi, forming a symmetrical sandwich arrangement. The assembly so formed is then subjected a final pressing step at 3000 to 5000 psi preferably about 3600 psi. The pressure is important in that it is a major controlling factor in the porosity of the final product. Generally, a low pressure does not provide adequate mechanical strength; a high pressure reduces the porosity of the final product. At pressures above 5000 psi the porosity of the electrode obtained becomes too low and the internal resistance too high. The silver compound uniformly distributed in the mixture contributes to the porous structure of the final electrode due to a volume change during decomposition. However, the amount of silver compound in the mixture is relatively small. Therefore, its contribution to the porosity of the final product is insignificant when compared with the contribution of the pressure.

The compressed assembly is then sintered at a temperature sufficient to reduce a silver compound to metallic silver. The sintering is important not only to provide a porous structure to the electrode but also to import maximum mechanical strength. To obtain the porous structure, the temperature of the heating step must be lower then the melting point of silver chloride, otherwise the latter melts and closes up to the porous structure. That is, if the silver chloride is permitted to melt, the pores are filled and one obtains a solid electrode similar to the cold rolled sheet. The time required for sintering depends primarily upon the temperatures applied. At lower or higher temperatures, the time to reach maximum mechanical strength will be proportionally longer or shorter.

For practical purposes, sintering may be preferably carried out at a temperature of 350°–430° C. for at least one hour.

Sintering at a temperature of 400°–415° C. for about two hours is particularly preferred.

The decomposition of silver compounds forms a thin, uniform, intimately bound layer of metallic silver on each silver chloride particle. The layers of metallic silver on adjacent particles are also intimately bound thereby forming a matrix or network structure having a good conductivity not obtainable with powdered silver.

The starting mixture comprises a major amount of silver chloride and a minor amount of silver compound to be reduced. The ratio between the two components may be widely varied. However, the preferred amounts are about 90% by weight of silver chloride and about 10% by weight of the silver compound. Usually, 10% by weight of silver compound is sufficient to enable formation of the metallic silver network having maximum conductivity. With smaller amounts of the silver compound, metallic silver layers formed will be thinner, the conductivity lower and the voltage during discharge of the formed electrode lower. With a greater amount of the silver compound, excess metallic silver will be formed which does not take part in the electrochemical reaction when used in batteries and which therefore decreases the energy density. Electrodes prepared from mixtures containing more or less than 10% by weight of the silver compounds may be acceptable if energy density or cell voltage is not a main consideration.

The individual layers of the multilayer electrodes are porous. The porosity and pore size will depend upon the particle size of the silver chloride. Generally, the smaller the particles the smaller the pores. It is necessary that the silver chloride and silver oxide be finely divided to produce a homogeneous mixture. The particle size of the silver oxide or silver compound used for producing the conductive matrix must be significantly smaller than the silver chloride so that only a very thin and uniform layer of silver is produced on the surface of the silver chloride particles during the decomposition and sintering step.

The following examples further illustrate preferred embodiments of the present invention.

Figure 2:
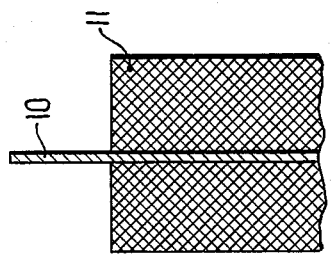
FIG. 2 is a side elevation in section of an electrode according to the present invention.

Three layers of a $AgCl/Ag_2O$ mix of varying silver chloride particle size and $Ag_2O$ content were successively spread on both opposed major surfaces of a silver grid and compressed individually each at about 1000 psi to form a symmetrical sandwich arrangement as seen in FIG. 2.

The layers are numbered one, two and three from the grid outward. Approximately 1 gram of mix was used in each layer so that the total weight of material applied on each side was 3 grams. A final pressing at about 3600 psi was made. Sintering and thermal decomposition of silver I oxide was carried out as before. The proportions of silver chloride and $Ag_2O$ were so chosen that upon thermal decomposition of $Ag_2O$ to metallic silver, the final weight percentage of silver in each layer was one of about 5, 10 or 15% by weight based upon the weight of the layer in question. One mix of each of these three compositions was so chosen so that the final overall metallic silver content in each cathode was about 10% by weight based on the weight of the electrode. Three different silver chloride particle size distributions were employed, namely, less than $125\mu$, $125\mu$ to $250\mu$ and $250\mu$ to $500\mu$.

ELECTROCHEMICAL PROCEDURE

Figure 3:
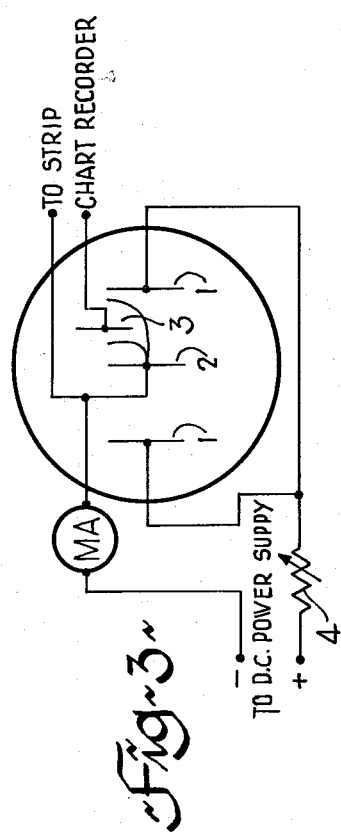
FIG. 3 is a line diagram of the cell used to discharge electrodes according to the present invention.

The silver chloride electrodes were placed in a cell shown in FIG. 3. The reference electrode 3, in a separate glass compartment with a Luggin capillary, was the homogenous type of Ag/AgCl electrode as seen in FIG. 1. This electrode is used as a standard for comparison purposes. The electrode was made from a blend of 10.76% by weight $Ag_2O$ (about 325 mesh, $25\mu$ average particle size) and 89.24% by weight AgCl (less than 60 mesh, $250\mu$ maximum particle size). These amounts were so chosen that upon thermal decomposition of the $Ag_2O$ to silver, the final percentage by the weight of metallic silver in the cathode would be about 10%.

The electrodes were constructed in the following manner. The silver grid 10 was placed on 3 grams of the mixture in a mold. A pressure of about 1000 psi was applied. The insert was removed and 3 L grams of the blend were placed on the grid. A final pressing at about 3600 psi was applied. The electrodes were then placed in an oven at 410° C.±5° C. i.e. below the melting point of silver chloride which is about 455° C., for about two hours in an air temperature. At this temperature sintering of the silver chloride and thermal decomposition of the silver oxide occured.

The working electrode 2 according to the invention was placed between two platinum counter electrodes 1 and discharged at a current of 36 mA this corresponds to a current density of 2 $mA/cm^2$ based on the geometric area of the Ag/AgCl electrode. All discharges described were carried out at −40° C.±1.0° C.

A Hewlett Packard (6294A) DC power supply (not shown) was used to reduce the cathode. The applied voltage to the cell and dropping resistor was held at 22½ volts while a constant current was maintained through the variable dropping resistor 4. During the reduction of these electrodes, available surface area is continually changing, necessitating the use of a variable rather than fixed resistor. A Hewlett Packard 7100B strip chart recorder (not shown) was used to monitor the voltage between the cathode 2 and the reference electrode 3.

The results for cathodic discharge of the various Ag/AgCl electrodes together with the distribution of AgCl particle size and metallic silver content in each layer are presented in table one.

TABLE I

Efficiency of Laminated Ag/AgCl Electrodes Discharged at 2 mA/cm$^2$, −40° C.

| Example No. | AgCl Particle Size (μ) | | | % Ag W/W | | | Electrode Efficiency % |
|---|---|---|---|---|---|---|---|
| | Layer 1 | Layer 2 | Layer 3 | Layer 1 | Layer 2 | Layer 3 | |
| 1 | <125 | 125–250 | 250–500 | 15 | 10 | 5 | 99 |
| 2 | 125 | 125–250 | 250–500 | 5 | 10 | 15 | 96 |
| 3 | 125 | 125–250 | 250–500 | 10 | 10 | 10 | 86 |
| 4 | 250–500 | 125–250 | <125 | 10 | 10 | 10 | 79 |
| 5 | 250–500 | 125–250 | 125 | 15 | 10 | 5 | 77 |
| 6 | 250–500 | 125–250 | 125 | 5 | 10 | 15 | 75 |
| 7* | <125 | <125 | <125 | 10 | 10 | 10 | 81 |

*Control Standard
All results are an average obtained from three electrodes variation ± 2%.

Electrode efficiency was calculated from the initial amount of silver chloride in the electrode and the electrical capacity measured during discharge to an overvoltage of 300 mV, at which time the discharges were discontinued.

Calculation of efficiency:
(a) Wt of silver chloride = 5.4 g (grid and Ag$_2$O not included)
(b) Theoretical run time $$\frac{\frac{5.4}{143.3} \times 96500}{.036 \times 3600} = 28.0 \text{ hr.}$$

$$\% \text{ Efficiency} = \frac{\text{Run Time}}{28} \times 100 \quad (c)$$

Figure 4:
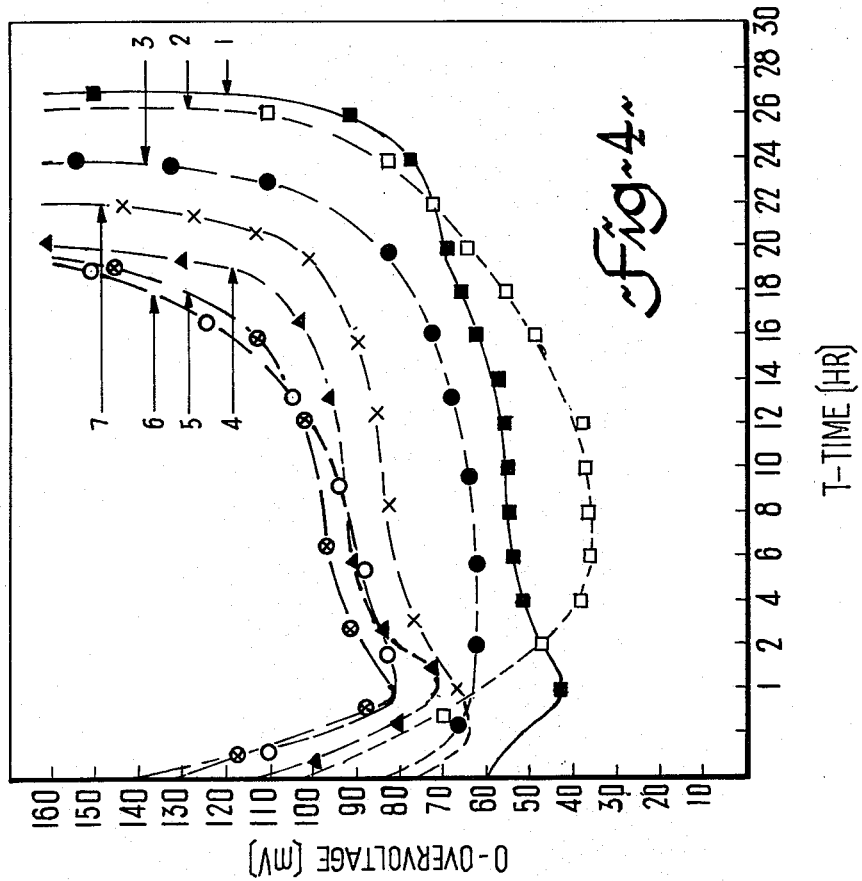
FIG. 4 is a graph illustrating the discharge of the electrodes according to the present invention.

The discharge curves are presented in FIG. 4. All discharges were carried out at 2 mA/cm$^2$ −40° C. The electrolyte was 22½% LiCl w/w (6.85 molal).

Comparison of the discharges of the electrodes in FIG. 4 show that the overvoltage after the initial 2 hr. period increased in the order of 2,1,3,7,4,5, and 6. Since the electrodes can be arranged in three groups according to silver chloride particle size distribution; i.e. group one, electrodes one, two and three; group two, electrode seven; and group three, electrodes 4,5 and 6, it is evident that the silver chloride particle size distribution plays a predominate role in maintaining low overvoltage.

The group one electrodes were made with the particle size of silver chloride (and hence the pore size) increasing from the silver grid outward. This configuration would be expected to permit easy access of electrolyte to the interior of the electrode, to provide a larger usable area for the reduction of silver choride (i.e. a lower activation polarization) and a less restrictive path for the conduction and diffusion of chloride ions out into the bulk of the electrolyte (i.e. lower ohmic and concentration polarization).

Comparison of the efficiencies of group one electrodes with the group three electrode show that by reversing the distribution of particle size the effective utilization of silver chloride is reduced approximately 25%.

This effect can be explained by the inability to effectively reduce the large silver chloride particle in the interior of the group three electrodes. This view was supported by visual examination of the electrodes after discharge. The group three electrodes had visible pockets of undischarged silver chloride with the greatest concentrations at the center and interior of the electrode. Electrode 7 had smaller but more evenly distributed pockets of undischarged silver chloride. Since the efficiency of electrode 7 was intermediate between group one and three, but closer to that of group three, the pore size at the surface plays a critical role in the effective utilization of the material in the bulk of the electrode.

Although no definitive correlation could be made with regard to the effect of the silver content on the polarization or efficiency. The following trends were observed. For group one electrodes an uneven distribution of silver appears to be more beneficial than a uniform distribution. In the cases of groups two and three electrode, the opposite appeared to be true. There is a slight indication that a higher content of silver in the interior of the electrode, that is, near the grid increased the run out, see electrodes 1 and 2, and 5 and 6 of Table I.

Variation in the pore distribution and the particle size of the active material can affect the performance of porous silver chloride electrodes at −40° C. Electrodes with larger particles and pores on the outer surface of the electrode gave lower polarization and as much as 25% more utilization when compared to homogeneous electrodes or electrodes which had larger particles and pores at the center of the electrode near the grid. The silver content had a less predominant effect than particle size distribution. There is some evidence that a non-uniform distribution with more silver at the center, near the grid, was beneficial when compared to the same total silver content uniformly distributed throughout the electrode.

In view of the various embodiments described above, it should be apparent to those skilled in the art that the present invention may be embodied in forms other than those specifically described herein without departing from the spirit or central characteristics of the invention. Thus, the specific embodiments described above are to be considered in all respects as illustrative and by no means restrictive.

The embodiments of the invention in which an exclusive property or privilege is claimed are defined as follows:

1. A method for the manufacture of a silver/silver chloride electrode, said electrode comprising a plurality of layers of a porous material comprising an evenly dispersed matrix of metallic silver bonded to silver chloride particles, on both major surfaces of a metal grid, said method comprising:
(a) preparing a homogeneous mixture, in the form of a finely divided powder, of a major amount of silver chloride and a minor amount of a silver compound reducible to metallic silver at a temperature below the melting point of silver chloride, which silver compound is selected from the group consisting of silver oxides, silver carbonate, disilver fluoride, silver sulfide and mixtures thereof, (b) individually compressing a plurality of layers of said mixture, one on top of another onto a metal grid at pressures of about 800 to about 1500 psi,
(c) subjecting the assembly so formed to a final pressing step at pressures of about 3,000 to about 5,000 psi, and
(d) sintering, at a temperature below the melting point of silver chloride, for a time sufficient to reduce the silver compound to metallic silver.

2. A method according to claim 1, wherein the metal grid is in the form of a mesh or an expanded metal.

3. A method according to claim 2, wherein the metal of the grid is selected from silver and nickel.

4. A method according to claim 3, wherein said major amount is about 90%/w and wherein said minor amount is about 10%/w.

5. A method according to claim 4, wherein the silver compound is selected from silver oxides and silver carbonate.

6. A method according to claim 5, wherein said layers are individually compressed at about 1000 psi.

7. A method according to claim 6, wherein said final pressing step is carried out at about 3600 psi.

8. A method according to claim 7, wherein the sintering step is effected at about 350° C. to about 430° C. for about two hours.

9. A method according to claim 8, wherein the sintering step is effected at 410°±5° C.

10. A method according to claim 8, wherein the mixture is moistened before the compressing step.

11. A method according to claim 10, wherein the homogeneous mixture is in the form of a finely divided powder of a particle size of 60 mesh or smaller.

12. A method according to claim 11, wherein the amount of metallic silver in the electrode is about 10%/w, based on the weight of the electrode.

13. A method according to claim 12, wherein each of the plurality of layers includes silver chloride particles of different ranges of sizes.

14. A method according to claim 13, wherein each of the plurality of layers includes amounts of metallic silver within the range of about 5-15%/w, based on the weight of the specific layer.

15. A method according to claim 14, wherein the amount of metallic silver in each layer is selected from about 5, 10 and 15%/w based on the weight of the specific layer.

16. A method according to claim 15, wherein said three layers include silver chloride particle size ranges selected from $<125\mu$, $125-250\mu$ and $250-500\mu$.

17. A method according to claim 16, wherein the inner layer includes silver chloride of particle size $<125\mu$, wherein the middle layer includes silver chloride of particle size of $125-250\mu$ and wherein the outer layer includes silver chloride of particle sizes of $250-500\mu$.

18. A method according to claim 17, wherein the inner layer includes metallic silver in an amount of about 15%/w, wherein the middle layer includes metallic silver in an amount of about 10%/w, and wherein the outer layer includes silver in an amount of about 5%/w, all weight percentages being based on the weight of the specific layer.

19. A method according to claim 18, wherein the inner layer includes metallic silver in an amount of about 5%/w, wherein the middle layer includes metallic silver in an amount of about 10%/w, and wherein the outer layer includes metallic silver in an amount of about 15%/w, all weight percentages being based on the weight of the specific layer.

20. A method according to claim 1 or 18, wherein the silver compound is silver I oxide.

* * * * *